United States Patent
Scherpf

(10) Patent No.: US 7,597,481 B2
(45) Date of Patent: Oct. 6, 2009

(54) SEALED FOUR-ROW BALL BEARING FOR SUPPORT AND WORKING ROLLER BEARING ON ROLLER STANDS

(75) Inventor: Adolf Scherpf, Knetzgau-Unterschwappach (DE)

(73) Assignee: Schaeffler KG, Herzogenaurach (DE)

( * ) Notice: Subject to any disclaimer, the term of this patent is extended or adjusted under 35 U.S.C. 154(b) by 376 days.

(21) Appl. No.: 11/569,388

(22) PCT Filed: May 21, 2005

(86) PCT No.: PCT/DE2005/000932

§ 371 (c)(1),
(2), (4) Date: Jan. 9, 2007

(87) PCT Pub. No.: WO2005/116467

PCT Pub. Date: Dec. 8, 2005

(65) Prior Publication Data

US 2008/0013874 A1  Jan. 17, 2008

(30) Foreign Application Priority Data

May 26, 2004  (DE) ..................... 10 2004 025 796

(51) Int. Cl.
  *F16C 33/76* (2006.01)
  *F16C 33/52* (2006.01)
(52) U.S. Cl. .................. 384/470; 384/477; 384/523; 384/572; 384/574
(58) Field of Classification Search ................ 384/470, 384/480, 477, 488, 523–534, 572–580
See application file for complete search history.

(56) References Cited

U.S. PATENT DOCUMENTS 2,759,778 A * 8/1956 Anderson .................. 384/480
3,788,714 A * 1/1974 Degioia et al. ............. 384/482
4,213,656 A * 7/1980 Olschewski et al. ........ 384/480

(Continued)

FOREIGN PATENT DOCUMENTS

DE         19935014 A1 *   2/2000
DE         199 47 202 A    4/2001
GB         1 001 218 A     8/1965

*Primary Examiner*—Thomas R Hannon
(74) *Attorney, Agent, or Firm*—Lucas & Mercanti, LLP

(57) ABSTRACT

The invention relates to a sealing roller bearing, in particular, a ball bearing for support and working roller bearings on roller stands, comprising an axially multi-part outer bearing ring and an axially multipart inner bearing ring and a number of rolling bodies rolling on the running tracks in four rows between the bearing rings. The rolling bodies are retained in each row at an equal separation from each other in the circumferential direction by means of a bearing cage and the bearing chamber, formed between the outer bearing ring and the inner bearing ring, is sealed at both axial ends against the ingress of fluids and dirt by annular seals. According to the invention, each bearing cage of the roller bearing is embodied as a conventional pin cage, comprising a first cage disc, a second cage disc and a number of pins connected to both bearing discs, whereby the annular seals sealing the bearing chamber are embodied as lamellar rings with a sealing connection to the first or the second cage disc of both external bearing cages.

3 Claims, 2 Drawing Sheets

U.S. PATENT DOCUMENTS

| | | |
|---|---|---|
| 4,527,915 A | 7/1985 | Ikariishi et al. |
| 4,699,529 A | 10/1987 | Scholl et al. |
| 4,825,964 A * | 5/1989 | Rives .................. 384/470 |
| 4,895,215 A * | 1/1990 | Rives .................. 384/470 |
| 5,498,085 A | 3/1996 | Kizer et al. |
| 6,217,223 B1 * | 4/2001 | Brockmuller et al. ....... 384/523 |

* cited by examiner

SEALED FOUR-ROW BALL BEARING FOR SUPPORT AND WORKING ROLLER BEARING ON ROLLER STANDS

FIELD OF THE INVENTION

The invention relates to a sealed rolling bearing according to the features of the preamble of claim 1, and can be particularly advantageously implemented in sealed four-row tapered roller bearings for support roll and working roll bearing arrangements on cold-rolling and hot-rolling roll stands.

BACKGROUND OF THE INVENTION

It is generally known to a person skilled in the art of rolling bearing technology that the service life of a rolling bearing is considerably reduced by intruding fluids and dirt. Fluids and dirt of said type generally intrude into the rolling bearing when the rolling bearing is assembled in a dirty environment and above all when the rolling bearings are exposed to dirt, metal swarf and cooling liquids or the like during operation. Rolling bearings are exposed to a wide variety of impurities to a high degree in particular when they are used for mounting support rolls and working rolls on roll stands, so that a high degree of maintenance is required for the rolling bearings to achieve the intended service life of the bearing. One measure for reducing the maintenance expenditure and for increasing the service life of the bearing is therefore to suitably seal off the rolling bearings on roll stands of said type with respect to intruding fluids and dirt.

A sealed rolling bearing of said type is known generically from, for example, DE 199 35 014 A1. Said rolling bearing, which is embodied as a sealed four-row tapered roller bearing for support roll and working roll bearing arrangements on roll stands, is substantially composed of an axially multi-part outer bearing ring and an axially multi-part inner bearing ring as well as a number of rolling bodies which roll adjacent to one another in four rows between the bearing rings on the raceways thereof, with the rolling bodies of each row being held with uniform spacing relative to one another in the peripheral direction by means of in each case one bearing cage. The bearing space formed between the outer bearing ring and the inner bearing ring is sealed off with respect to intruding fluids and dirt at both axial ends by virtue of the inner bearing ring being formed at its axial end sections so as to be elongated relative to the axial end sections of the outer bearing ring, and by virtue of special sealing retainers being fitted on the elongated portions of the inner bearing ring, said sealing retainers having profiled ring seals and resting in each case against the axial end sections of the outer bearing ring. Said ring seals, embodied usually as metal-reinforced elastic radial shaft sealing rings, are on the one hand in each case fastened to the inner peripheral face of the sealing retainer and have, on the other hand, elastic sealing lips which extend to the inner bearing ring and are in sealing contact with the axially elongated end sections of the inner bearing ring and therefore hermetically seal off the bearing space formed between the outer bearing ring and the inner bearing ring.

In addition, it is also known from DE 42 06 764 A1 to design both the axial end sections of the inner bearing ring and the axial end sections of the outer bearing ring of a four-row tapered rolling bearing of said type to be elongated, and to fasten the ring seals, which are likewise embodied as radial shaft sealing rings, to the inner peripheral faces of the elongated portions of the outer bearing ring without special sealing retainers in such a way that the sealing lips of the radial shaft sealing rings slide on the cylinder faces of the elongated portions of the inner bearing ring.

However, a disadvantage of sealed rolling bearings of said type is that the elongated portions, which are provided specifically for sealing the rolling bearing, of the inner or also of the outer bearing ring increase the spatial requirement of the rolling bearing, and that rolling bearings which are sealed in this way must, for the same spatial requirement, be designed with lower load ratings than rolling bearings without seals, since the tapered rollers of the rolling bearings and their raceways must be of correspondingly smaller design as a result of the elongated portions. In addition to their relatively high costs, the known elastic radial shaft sealing rings have additionally proven to be disadvantageous in that, as a result of the frictional contact of their sealing lips against the cylinder faces of the elongated portions of the inner bearing ring, they are subject to an increased degree of wear and are therefore only suitable for providing sealing connections up to a certain speed limit. In addition, a failure in the cooling system of the roll stands can lead to a sudden temperature rise within the rolling bearing which goes beyond the temperature limit for elastic shaft sealing rings and therefore leads to damage to the radial shaft sealing rings, which lose their sealing function as a result.

OBJECT OF THE INVENTION

Proceeding from the described disadvantages of the solutions of the known prior art, the invention is therefore based on the object of designing a sealed rolling bearing, in particular a sealed four-row tapered roller bearing for support roll and working roll bearing arrangements on roll stands, whose bearing space formed between the outer bearing ring and the inner bearing ring is sealed off by means of cost-effective and low-wear seals without speed limits or temperature limits, and which, with the same spatial requirements, can be subjected to approximately the same load ratings as an equivalent rolling bearing without seals.

DESCRIPTION OF THE INVENTION

According to the invention, said object is achieved with a sealed rolling bearing according to the preamble of claim 1 in that each bearing cage of the rolling bearing is embodied as a pin cage which is known per se and is in each case composed of a first cage disk, a second cage disk and a plurality of pins which are connected to the two cage disks and guide in each case one rolling body with a central axial bore, and in that the ring seals which seal off the bearing space are embodied as lamellar rings which are sealingly connected respectively to the first and second cage disks of the two outer bearing cages.

Lamellar rings of said type are composed of at least two steel rings which are arranged adjacent to one another, are independent of one another or are double-wound, form a gap seal or labyrinth seal with one another, and are therefore distinguished by a good sealing effect. Here, a distinction is made between externally clamped lamellar rings, which are clamped against the inner peripheral wall of a bore; internally clamped lamellar rings, which are clamped against the outer peripheral wall of a shaft; as well as combinations of externally and internally clamped lamellar rings, where at least one partial ring is clamped against the inner peripheral wall of a bore and one partial ring is clamped against the outer peripheral wall of a shaft. The partial rings of said lamellar rings are in sealing contact at all times with an annular groove in the respectively opposite part, and have slight radial and axial play both relative to one another and relative to the annular groove, said play preventing inhibitive friction between the partial rings and between the lamellar rings and the annular groove, thereby providing a contact-free seal.

In an expedient embodiment of the sealed rolling bearing according to the invention, in each case one peripheral annular groove is therefore formed in the level outer peripheral faces of the first and second cage disks of the two outer bearing cages, said peripheral annular grooves in each case being in sealing contact with a double-wound lamellar ring which is clamped against the opposite level inner lateral surface of the outer bearing ring and projects into the annular groove. This firstly advantageously seals the gap formed between the outer peripheral faces of the outer cage disks of the outer pin cages and the inner lateral surface of the outer bearing ring at both axial sides of the rolling bearing, it alternatively also being possible to form the peripheral annular grooves in each case in the inner lateral surface of the outer bearing ring and to clamp the lamellar rings, such that they project in each case into said annular grooves, against the level outer peripheral faces of the first and second cage disks of the two outer bearing cages. Depending on the available space, it is likewise possible to use other suitable lamellar rings of the above described type instead of the double-wound lamellar rings.

To completely seal off the bearing space formed between the outer and the inner bearing ring, a further feature of the sealed rolling bearing according to the invention is accordingly that in each case one peripheral annular groove is likewise formed in the level outer lateral surface of the inner bearing ring adjacent to the outer raceways of the rolling bodies, said peripheral annular grooves in each case being in sealing contact with a further double-wound lamellar ring which is clamped against the level inner peripheral faces of the first and second cage disks of the two outer bearing cages and projects into the annular groove. This ultimately also advantageously seals the gap formed between the inner peripheral faces of outer cage disks of the outer pin cages and the outer lateral surface of the inner bearing ring at both axial sides of the rolling bearing, so that overall, the bearing space formed between the outer bearing ring and the inner bearing ring is hermetically sealed off with respect to intruding fluid and dirt. It is of course also possible here in an equivalent way to form the peripheral annular grooves in the level inner peripheral faces of the first and second cage disks of the two outer bearing cages, and to clamp the lamellar rings, such that they project into said annular grooves, against the level outer lateral surface of the inner bearing ring, and/or to use other suitable lamellar rings.

The rolling bearing according to the invention therefore has the advantage over the sealed rolling bearings known from the prior art that, by integrating the seal of the bearing space formed between the outer and the inner bearing ring into the existing cage disks of a bearing cage formed as a pin cage, elongated portions of the inner or also of the outer bearing ring, which increase the spatial requirement for the rolling bearing, are no longer required, so that rolling bearings which are sealed in this way can be designed with tapered rollers and raceways of the same dimensions, and therefore with the same load ratings, as rolling bearings without seals. The use of lamellar rings as ring seals additionally makes it possible to use such a sealing arrangement without a speed limit, since the lamellar rings, as a result of their contact-free sealing action, are never in frictional contact with one another or with the annular grooves opposite, and are therefore no longer subject to wear. Since lamellar rings of said type are additionally composed only of steel materials, a failure of the cooling system of the roll stands and a sudden temperature rise within the rolling bearing can no longer lead to damage which would cause said lamellar rings to lose their sealing function, so that there is also no longer a temperature limit for the use of a rolling bearing which is sealed according to the invention.

BRIEF DESCRIPTION OF THE DRAWINGS

One preferred embodiment of the sealed rolling bearing according to the invention is explained in more detail in the following with reference to the appended drawings, in which.

DETAILED DESCRIPTION OF THE DRAWINGS

Figure 1:
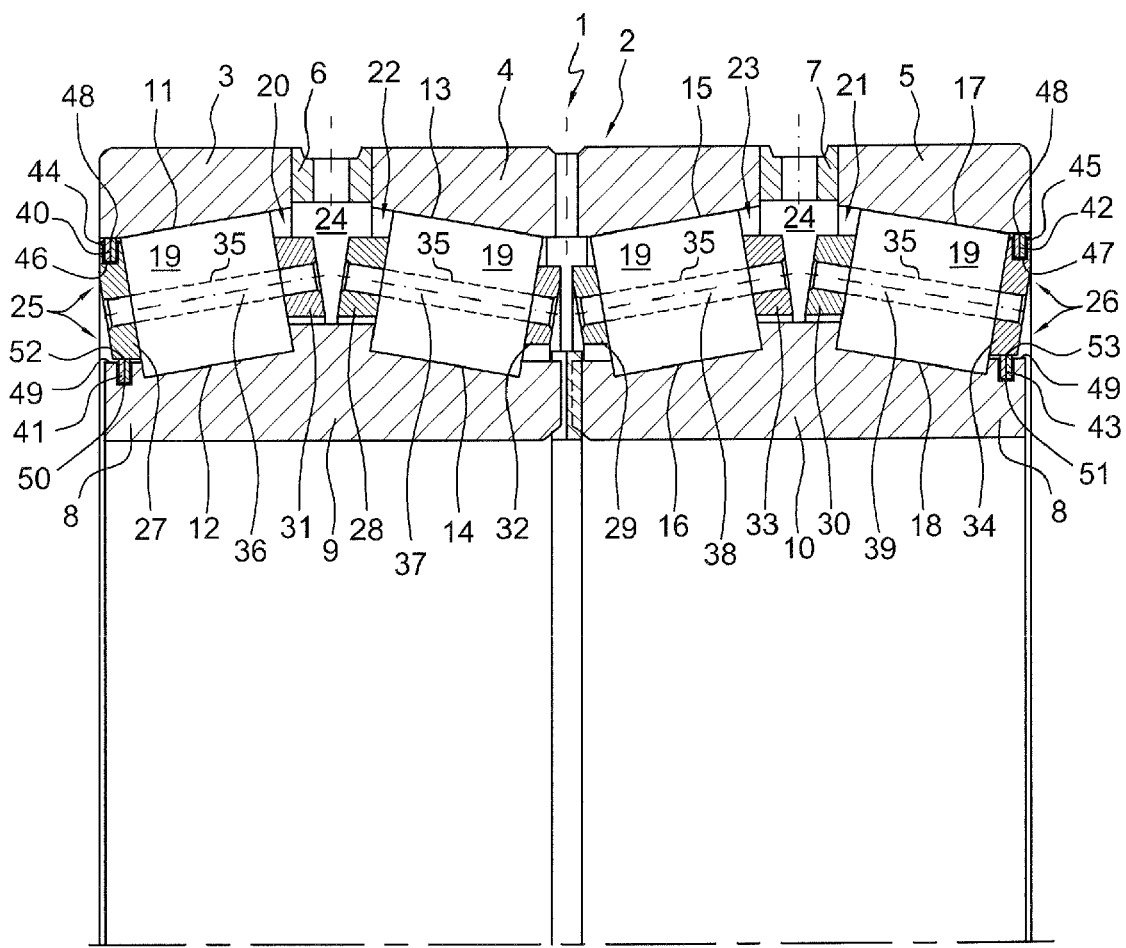
FIG. 1 shows the upper symmetrical half of a cross section through a sealed four-row tapered roller bearing according to the invention.

FIG. 1 clearly shows a rolling bearing 1 which is embodied as a four-row tapered roller bearing for support roll and working roll bearing arrangements on roll stands, and is substantially composed of an axially multi-part outer bearing ring 2 and an axially multi-part inner bearing ring 8 and of a number of rolling bodies 19 which roll adjacent to one another in four rows between the bearing rings 2, 8 on the raceways 11, 12, 13, 14, 15, 16, 17, 18 thereof. The outer bearing ring 2 is clearly visibly formed by a left-hand and a right-hand single-row running ring 3, 5, which single-row running rings 3, 5 bear against a central double-row running ring 4 via two intermediate rings 6, 7, while the inner bearing ring 8 is composed of a left-hand and a right-hand double-row running ring 9, 10, which double-row running rings 9, 10 are arranged one behind the other axially. In addition, it can be seen in FIG. 1 that the rolling bodies 19 of each row are held with uniform spacing relative to one another in the peripheral direction by means of in each case one bearing cage 20, 21, 22, 23, and that the bearing space 24 formed between the outer bearing ring 2 and the inner bearing ring 8 is sealed off with respect to intruding fluids and dirt at both axial ends by means of ring seals 25, 26.

It is ultimately also clear from FIG. 1 that each bearing cage 20, 21, 22, 23 of the rolling bearing 1 is embodied as a pin cage which is known per se and is in each case composed of a first cage disk 27, 28, 29, 30, a second cage disk 31, 32, 33, 34 and a plurality of pins 36, 37, 38, 39 which are connected to the two cage disks 27, 28, 29, 30, 31, 32, 33, 34 and guide in each case one rolling body 19 which is formed with a central axial bore 35. According to the invention, said bearing cages 20, 21, 22, 23 which are embodied as pin cages are integrated into the seal of the bearing space 24 formed between the outer bearing ring 2 and the inner bearing ring 8 by virtue of the ring seals 25, 26 which seal off the bearing space 24 being embodied as lamellar rings 40, 41, 42, 43 which are sealingly connected respectively to the first and second cage disks 27, 34 of the two outer bearing cages 20, 21.

Figure 2:
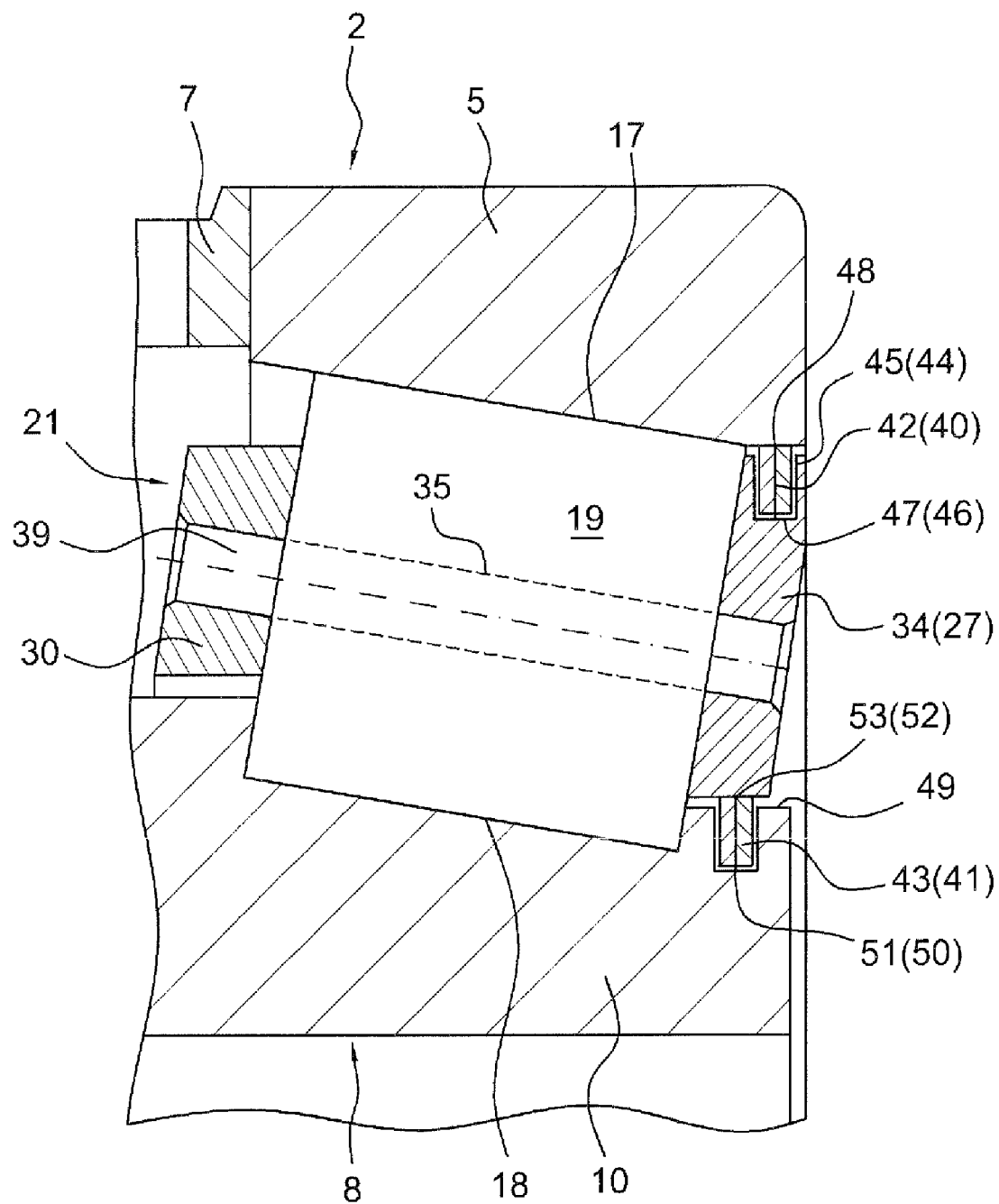
FIG. 2 shows an enlarged illustration of the outer section of the cross section, illustrated in FIG. 1, through a sealed four-row tapered roller bearing according to the invention.

The enlarged illustration in FIG. 2 of the right-hand outer section of the cross section through the rolling bearing 1 according to the invention as illustrated in FIG. 1, with the equivalent reference symbols from the left-hand outer section of the rolling bearing 1 according to the invention being specified in parentheses, shows here that in each case one peripheral annular groove 46, 47 is formed in the level outer peripheral faces 44, 45 of the first and second cage disks 27, 34 of the two outer bearing cages 20, 21. Said annular groove 46 is in each case in sealing contact with a double-wound lamellar ring 40, 42 which is clamped against the opposite level inner lateral surface 48 of the outer bearing ring 2 and projects into the annular groove 46, 47, so that the gap formed between the outer peripheral faces 44, 45 of the outer cage disks 27, 34 of the pin cages 20, 21 and the inner lateral surface 48 of the outer bearing ring 2 at both axial sides of the rolling bearing 1 is sealed off.

It is additionally clear from FIG. 2 that in each case one peripheral annular groove 50, 51 is formed in the level outer lateral surface 49 of the inner bearing ring 8 adjacent to the outer raceways 12, 18 of the rolling bodies 19, said peripheral annular grooves 50, 51 in each case being in sealing contact with a further double-wound lamellar ring 41, 43 which is clamped against the level inner peripheral faces 52, 53 of the first and second cage disks 27, 34 of the two outer bearing cages 20, 21 and projects into the annular groove 50, 51. Said lamellar rings 41, 43 ultimately also seal the gap formed between the inner peripheral faces 52, 53 of the outer cage disks of the outer pin cages 20, 21 and the outer lateral surface 49 of the inner bearing ring 8 at both axial sides of the rolling bearing 1, so that overall, the bearing space 24 formed between the outer bearing ring 2 and the inner bearing ring 8 is hermetically sealed with respect to intruding fluid and dirt.

| List of reference symbols | |
|---|---|
| 1 | Rolling bearing |
| 2 | Outer bearing ring |
| 3 | Left-hand running ring |
| 4 | Central running ring |
| 5 | Right-hand running ring |
| 6 | Intermediate ring |
| 7 | Intermediate ring |
| 8 | Inner bearing ring |
| 9 | Left-hand running ring |
| 10 | Right-hand running ring |
| 11 | Raceway |
| 12 | Raceway |
| 13 | Raceway |
| 14 | Raceway |
| 15 | Raceway |
| 16 | Raceway |
| 17 | Raceway |
| 18 | Raceway |
| 19 | Rolling bodies |
| 20 | Outer bearing cage |
| 21 | Outer bearing cage |
| 22 | Inner bearing cage |
| 23 | Inner bearing cage |
| 24 | Bearing space |
| 25 | Ring seal |
| 26 | Ring seal |
| 27 | First cage disk |
| 28 | First cage disk |
| 29 | First cage disk |
| 30 | First cage disk |
| 31 | Second cage disk |
| 32 | Second cage disk |
| 33 | Second cage disk |
| 34 | Second cage disk |
| 35 | Axial bore |
| 36 | Pin |
| 37 | Pin |
| 38 | Pin |

-continued

| List of reference symbols | |
|---|---|
| 39 | Pin |
| 40 | Lamellar ring |
| 41 | Lamellar ring |
| 42 | Lamellar ring |
| 43 | Lamellar ring |
| 44 | Outer peripheral face |
| 45 | Outer peripheral face |
| 46 | Annular groove |
| 47 | Annular groove |
| 48 | Inner lateral surface |
| 49 | Outer lateral surface |
| 50 | Annular groove |
| 51 | Annular groove |
| 52 | Inner peripheral face |
| 53 | Inner peripheral face |

The invention claimed is:

1. A sealed rolling bearing, comprising a sealed four-row tapered roller bearing for support roll and working roll bearing arrangements on roll stands said rolling bearing being substantially composed of an axially multi-part outer bearing ring and an axially multi-part inner bearing ring and of a number of rolling bodies which roll adjacent to one another in four rows between the outer bearing ring and the inner bearing ring on raceways thereof, the rolling bodies of each row being held with uniform spacing relative to one another in a peripheral direction by means of in each case one bearing cage, and a bearing space formed between the outer bearing ring and the inner bearing ring being sealed off with respect to intruding fluids and dirt at both axial ends by means of ring seals wherein each bearing cage of the rolling bearing is embodied as a pin cage and is in each case composed of a first cage disk, a second cage disk and a plurality of pins which are connected to the first cage disk and the second cage disk and guide in each case one rolling body with a central axial bore, and in that the ring seals, which seal off the bearing space, are each embodied as a double-wound lamellar ring which are sealingly connected respectively to the first cage disk and the second cage disk of the two axially outer bearing cages.

2. The sealed rolling bearing of claim 1, wherein one peripheral annular groove is formed in the level outer peripheral faces of the first cage disk and the second cage disk of the two axially outer bearing cages, said peripheral annular groove being in sealing contact with the double-wound lamellar ring which is clamped against an opposite level inner lateral surface of the outer bearing ring and projects into the peripheral annular groove.

3. The sealed rolling bearing of claim 1, wherein one peripheral annular groove is formed in a axial level outer lateral surface of the inner bearing ring adjacent to outer raceways of the rolling bodies, said peripheral annular groove being in sealing contact with the double-wound lamellar ring which is clamped against a level inner peripheral faces of the first cage disk and the second cage disk of the two axially outer bearing cages and projects into the peripheral annular groove.

* * * * *